US011540053B2

(12) United States Patent
Chatelet et al.

(10) Patent No.: US 11,540,053 B2
(45) Date of Patent: Dec. 27, 2022

(54) METHOD OF SYNCHRONIZING PIECES OF AUDIO EQUIPMENT

(71) Applicant: SAGEMCOM BROADBAND SAS, Rueil Malmaison (FR)

(72) Inventors: Antoine Chatelet, Rueil Malmaison (FR); Guillaume Rouhart, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 17/672,273

(22) Filed: Feb. 15, 2022

(65) Prior Publication Data

US 2022/0264222 A1  Aug. 18, 2022

(30) Foreign Application Priority Data

Feb. 15, 2021 (FR) ...................... 2101437

(51) Int. Cl.
*H04R 3/12* (2006.01)
*H04R 5/04* (2006.01)
*H04R 27/00* (2006.01)

(52) U.S. Cl.
CPC ............. *H04R 3/12* (2013.01); *H04R 5/04* (2013.01); *H04R 27/00* (2013.01); *H04R 2227/005* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 7,272,129 B2* | 9/2007 | Calcev | ............... | H04W 56/002 370/350 |
| 7,792,158 B1* | 9/2010 | Cho | ...................... | H04J 3/0664 370/518 |
| 10,057,866 B2* | 8/2018 | Cho | ...................... | H04J 3/0661 |
| 10,750,438 B2 | 8/2020 | Young | | |
| 2016/0323838 A1 | 11/2016 | Hsu et al. | | |

FOREIGN PATENT DOCUMENTS

CN 110099439 A 8/2019

* cited by examiner

*Primary Examiner* — Paul W Huber
(74) *Attorney, Agent, or Firm* — Muncy, Geissler, Olds & Lowe, P C.

(57) ABSTRACT

A synchronization method performed for a first piece of audio equipment connected to a wireless network via a first radio point that is identified by a first BSSID, the method comprising the steps of: detecting a second piece of audio equipment connected to the same wireless network and forming part of the same audio group; acquiring a second BSSID of a second radio point via which the second piece of audio equipment is connected to the wireless network, and then determining whether the first BSSID and the second BSSID are identical; if not, performing a selection stage to select an optimum radio point that is identified by an optimum BSSID; if the optimum BSSID is different from the first BSSID, connecting the first piece of audio equipment to the wireless network via the optimum radio point.

15 Claims, 6 Drawing Sheets

METHOD OF SYNCHRONIZING PIECES OF AUDIO EQUIPMENT

The invention relates to the field of pieces of "smart" audio equipment that can be grouped together to play back an audio stream in synchronized manner.

BACKGROUND OF THE INVENTION

At present there exists a great variety of pieces of electronic equipment that are capable of playing back a sound stream on one or more audio channels. In conventional manner, each of those pieces of electronic equipment comprises one or more loudspeakers together with electronic components and software for acquiring, processing, and delivering audio signals to the loudspeakers.

The term "pieces of audio equipment" is used herein to designate such pieces of electronic equipment.

In conventional manner, each of those pieces of audio equipment also incorporates a local area network (LAN) interface that enables said pieces of audio equipment to connect to a LAN. The technology used for the LAN interface is typically Wi-Fi technology or Ethernet technology.

Such pieces of audio equipment naturally include not only smart speakers, soundbars, and voice assistants, but also TV sets, decoder boxes, etc.

Some of those pieces of audio equipment can be associated with one another and configured to improve the listening experience of the user, or indeed to perform new functions.

It is thus possible to group together a plurality of pieces of audio equipment in a common audio group for playing back simultaneously a common global sound stream. The pieces of audio equipment may be grouped together as a pair (stereo) or indeed they may form a multichannel audio system (e.g. in the 5.1 format).

The new functions include the "multiroom" function, which enables different audio groups (or zones) to be defined, each of which comprises one or more pieces of audio equipment, and which enables sound playback to be synchronized between those various audio groups.

When these functions are implemented, each piece of audio equipment of the audio group plays back a particular sound stream that forms part of the global sound stream being played back by the audio group. It is fundamental for the various particular sound streams to be played back in perfectly synchronous manner so as to avoid any time offset in the playback, which could degrade sound rendering.

A first solution for ensuring such synchronization consists in having each piece of audio equipment incorporate a very accurate clock system with very low drift. However, such clock systems are expensive. That first solution also requires every piece of audio equipment in the audio group to be provided with its own such clock system, which constitutes a major constraint for the user.

A second solution consists in delivering a common reference clock to each piece of audio equipment in the audio group in order to achieve synchronized sound playback.

In order to obtain such a common reference, proposals have been made to use the time synchronization function (TSF) of the Wi-Fi access point. The Wi-Fi access point broadcasts TSF information at regular intervals to all of its connected clients by means of Beacon type frames.

In general, the user configures the pieces of audio equipment so that they are connected to the same home wireless network that is identified by a service set identifier (SSID). SSID installation is common practice for pieces of audio equipment using a wireless interface since it is flexible. The audio equipment could be connected to a more complicated mesh network and/or via an extender in a manner that is transparent and simple for the user to understand.

After being configured, each piece of audio equipment then accesses the wireless network by connecting itself autonomously to the residential gateway of the home, or possibly to a Wi-Fi repeater. However, in certain configurations, and in particular when the pieces of audio equipment are connected to the wireless network via bands at different frequencies (e.g. 2.4 gigahertz (GHz) and 5 GHz), or indeed when certain pieces of audio equipment are connected to the residential gateway while others are connected to a Wi-Fi repeater, the sources of the time synchronization function are different and consequently they cannot be used for accurately synchronizing the pieces of audio equipment in the audio group.

OBJECT OF THE INVENTION

An object of the invention is to obtain sound playback synchronization that is very accurate within an audio group, and to do so in a manner that is not very constraining for the user and without increasing the cost of the pieces of audio equipment making up the audio group.

SUMMARY OF THE INVENTION

In order to achieve this object, there is provided a synchronization method performed for a first piece of audio equipment connected via a first radio point that is identified by a first basic SSID (BSSID) to a wireless network that is identified by an SSID, the first piece of audio equipment forming part of an audio group, the synchronization method comprising the following steps:
  detecting a second piece of audio equipment connected to the same wireless network and forming part of the same audio group;
  acquiring a second BSSID of a second radio point via which the second piece of audio equipment is connected to the wireless network, and then determining whether the first BSSID and the second BSSID are identical;
  if not, performing a selection stage to select an optimum radio point that identified by an optimum BSSID; and
  if the optimum BSSID is different from the first BSSID, connecting the first piece of audio equipment to the wireless network via the optimum radio point;
  using a time synchronization function supplied by the optimum radio point to synchronize playback performed by the first piece of audio equipment of a first sound stream forming part of a global sound stream played back by the audio group.

The synchronization method of the invention thus enables a common optimum radio point to be selected that is identified by an optimum BSSID and to which the first and second pieces of audio equipment can be connected in order to access the wireless network.

The "forced" connection via the common optimum radio point makes it possible to ensure that the first and second pieces of audio equipment make use of the same source for the time synchronization function, thereby enabling them to play back the global sound stream in perfectly synchronized manner without giving rise to any time offset in playback.

The synchronization method of the invention is very inexpensive to perform since it does not require any particular hardware resources. The synchronization method of the invention is not constraining in any way for the user, since it can be executed in autonomous manner by the first piece of audio equipment (and by the second piece of audio equipment). The synchronization method can be performed in an audio group comprising pieces of audio equipment of any type and not necessarily pieces of audio equipment having hardware characteristics that are identical, which is a highly advantageous for the user.

There is also provided a synchronization method as described above, wherein a distinct priority level is allocated to each of the first and second pieces of audio equipment, and wherein, during the selection stage, the optimum radio point that is selected is the radio point that is connected to that one of the first and second pieces of audio equipment that has the higher priority level.

There is also provided a synchronization method as described above, wherein the priority levels are representative of the respective roles performed in the audio group by the first and second pieces of audio equipment.

There is also provided a synchronization method as described above, wherein a plurality of audio channels are defined in the audio group, and wherein each role corresponds to playing back a respective one of the audio channels.

There is also provided a synchronization method as described above, wherein the priority levels are defined from identifiers of the first and second pieces of audio equipment.

There is also provided a synchronization method as described above, wherein the identifiers are serial numbers or media access control (MAC) addresses.

There is also provided a synchronization method as described above, including the step of exchanging both first connection information relating to a connection between the first piece of audio equipment and the first radio point and/or the second radio point, and also second connection information relating to a connection between the second piece of audio equipment and the first radio point and/or the second radio point, the selection stage comprising the step of selecting the optimum radio point from the first connection information and from the second connection information.

There is also provided a synchronization method as described above, wherein, after detecting the second piece of audio equipment, the first piece of audio equipment establishes a point-to-point connection with the second piece of audio equipment, said point-to-point connection enabling the first and second pieces of audio equipment to exchange the first connection information and the second connection information.

There is also provided a synchronization method as described above, wherein the point-to-point connection uses a WebSocket protocol.

There is also provided a synchronization method as described above, wherein, if the first and second pieces of audio equipment are both capable of establishing a radio connection only with the same one radio point selected from among the first and second radio points, then the optimum radio point that is selected is said one radio point.

There is also provided a synchronization method as described above, wherein the first connection information includes a level S2E1 for the radio signal transmitted by the first radio point and received by the first piece of audio equipment, and a level S2E1 for the radio signal transmitted by the second radio point and received by the first piece of audio equipment, wherein the second connection information includes a level S1E2 for the radio signal transmitted by the first radio point and received by the second piece of audio equipment, and a level S2E2 for the radio signal transmitted by the second radio point and received by the second piece of audio equipment, and wherein, if:

$$\text{MIN}(S1E1, S1E2) > \text{MIN}(S2E1, S2E2)$$

then the optimum radio point that is selected is the first radio point.

There is also provided a synchronization method as described above, wherein detecting the second piece of audio equipment comprises acting at regular intervals to perform the step of searching the wireless network by using a discovery protocol.

There is also provided a synchronization method as described above, the synchronization method being performed in the first piece of audio equipment.

There is also provided audio equipment including a LAN interface and a processor module in which the synchronization method as described above is performed.

There is also provided a computer program including instructions for causing the processor module of the audio equipment as described above to execute the steps of the synchronization method as described above.

There is also proposed a computer-readable storage medium storing the computer program as described above.

The invention can be better understood in the light of the following description of a particular, nonlimiting implementation of the invention.

BRIEF DESCRIPTION OF THE DRAWINGS

Reference is made to the accompanying drawings, in which.

DETAILED DESCRIPTION OF THE INVENTION

The invention is illustrated herein by means of an example implementation that is naturally not limiting in any way.

A user possesses pieces of smart equipment and, in particular, two smart speakers. The user seeks to connect both smart speakers to a wireless network that is located at home, and furthermore seeks to group together the two smart speakers within a single audio group in order to obtain sound playback in stereo.

Figure 1:
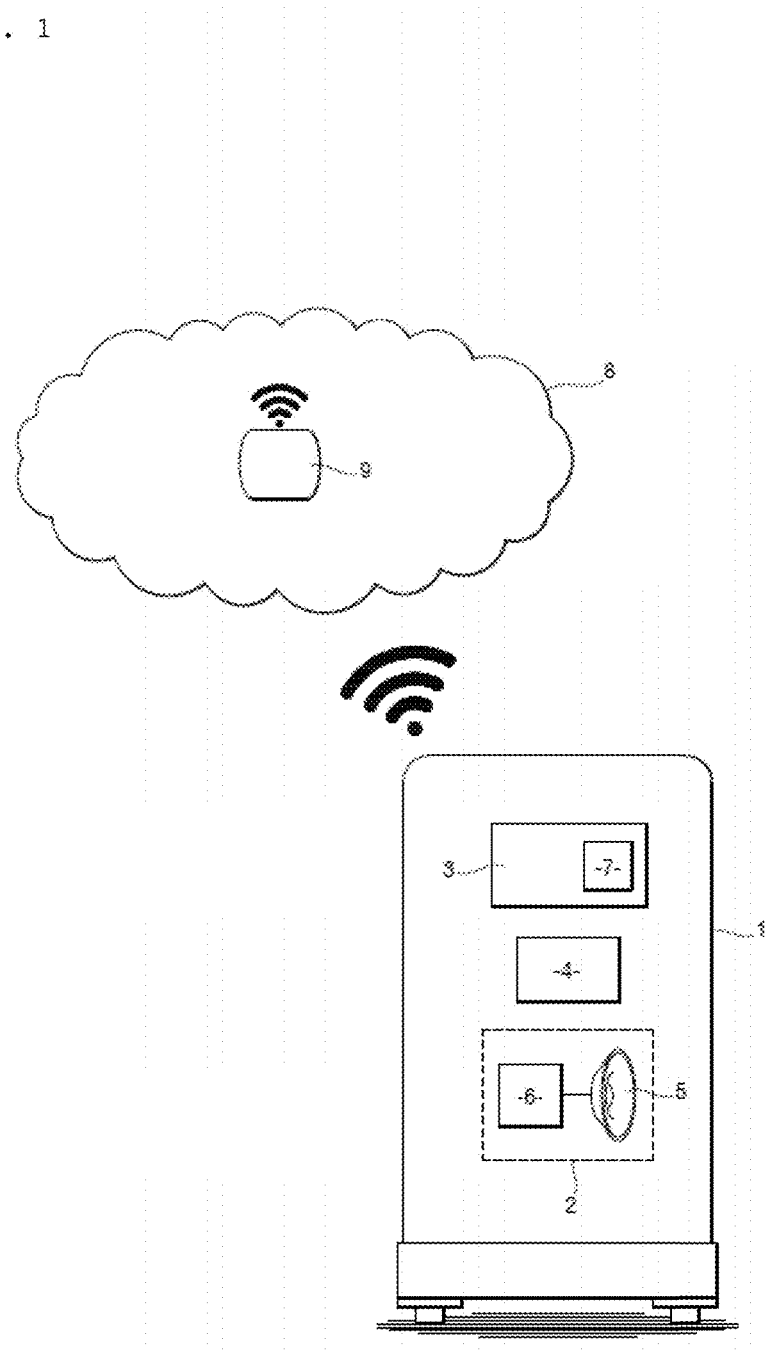
FIG. 1 shows a smart speaker in which the synchronization method of the invention is implemented.

With reference to FIG. 1, each smart speaker 1 comprises a sound module 2, a local area network (LAN) interface 3, and a processor module 4.

The sound module 2 comprises one or more loudspeakers 5 together with electronic components and software 6 arranged to acquire an audio signal and to deliver the audio signal to the loudspeakers 5 after performing various kinds of processing (e.g. including digital to analog conversion). The sound module 2 enables the smart speaker 1 to play back a sound stream on one audio channel.

In this example, the LAN interface 3 is a Wi-Fi interface incorporating a Wi-Fi driver 7 (which may comprise both hardware elements and software elements).

The processor module 4 of the smart speaker 1 includes at least one processor component that is adapted to execute instructions of a program for performing the synchronization method of the invention. The program is stored in a memory that is connected to or incorporated in the processor component. By way of example, the processor component is a processor, a digital signal processor (DSP), a microcontroller, or indeed a programmable logic circuit such as a field programmable gate array (FPGA) or an application-specific integrated circuit (ASIC).

An application module (software) is programmed in the processor module 4. The application module is in charge of managing the network and dialog with the Wi-Fi driver 7.

The application module and the LAN interface 3 thus enable the smart speaker 1 to be connected to the user's home wireless network 8 via a radio point 9.

The term "radio point" is used to designate any entity incorporating a radio transceiver with which pieces of equipment can become connected in order to access a wireless network that is identified by a service set identifier (SSID). In said wireless network that is identified by said SSID, a radio point is identified by a basic service set identifier (BSSID).

Thus, an access point, such as a residential gateway, can incorporate a plurality of radio points 9 (which might possibly operate on different frequencies). A Wi-Fi repeater may also incorporate one or more radio points 9.

Specifically, the user's home includes a residential gateway, which has two radio points 9, and a plurality of Wi-Fi repeaters, each of which has a respective radio point 9.

The user controls the smart speakers 1 by means of an application installed on the user's smartphone.

When installing each of the smart speakers 1, the user specifies the audio group of which said smart speaker 1 is to form a part. In this example, the two smart speakers 1 of the stereo pair are to form parts of the same stereo audio group.

The user also specifies the SSID that identifies the wireless network 8, together with the password associated with said SSID.

On the basis of the pair comprising the SSID and the password, the processor module 4 of each smart speaker 1 creates a persistent network block in the application module in charge of managing the network. The term "network block" is used to designate a set of connection parameters that enable a piece of equipment to connect with a radio point.

The application module attempts continuously to connect with the best of the radio points 9 corresponding to the properties specified by the user, and continues to do so so long as no higher-priority network blocks are created.

Optionally, the role of each smart speaker 1 also be specified during configuration. In this example, the term "role" is used to mean playing back one particular audio channel: the left channel or the right channel for a stereo pair.

This information is delivered to the smart speakers 1 via application programming interfaces (APIs).

As mentioned above, it is essential to ensure that the smart speakers 1 of the audio group are properly synchronized in order to play back the sound stream.

In this example, in order to synchronize playback of the sound stream, the smart speakers 1 make use of common time information. As mentioned above, this time synchronization function (TSF) is included in Wi-Fi frames of the Beacon type, which are broadcast by the radio points 9 at very regular intervals (by default, about once every 100 milliseconds (ms)).

An object of the invention is to ensure that the smart speakers 1 of the audio group make use of time synchronization function (TSF) information coming from a single TSF source.

With reference to FIGS. 2 to 6 there follows a description of how the synchronization method of the invention is implemented in the first smart speaker 1a. The synchronization method is also implemented in the same manner in the second smart speaker 1b (and more generally in all of the pieces of audio equipment in an audio group, which need not necessarily be two in number, and which need not necessarily be smart speakers).

Figure 2:
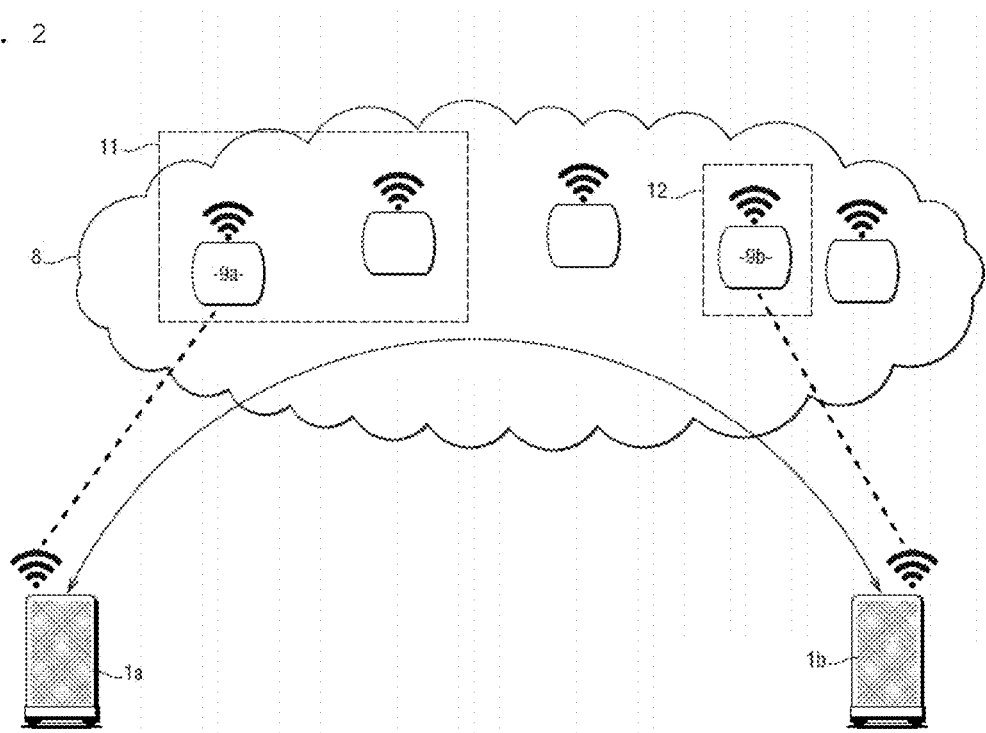
FIG. 2 shows a first smart speaker that is connected to the wireless network via a first radio point and a second smart speaker that is connected to the wireless network via a second radio point.

With reference to FIG. 2, the user has thus connected the first smart speaker 1a to the wireless network 8 identified by the SSID. The first smart speaker 1a is connected to the wireless network 8 via a first radio point 9a that is incorporated in the residential gateway 11. The user has specified that the first smart speaker 1a forms part of the stereo audio group.

Likewise, the second smart speaker 1b is connected to the wireless network 8 via a second radio point 9b that is incorporated in a Wi-Fi repeater 12. The user has specified that the second smart speaker 1b forms part of the stereo audio group.

The first smart speaker 1a declares its presence on the wireless network 8.

The processor module 4 of the first smart speaker 1a makes use of Bonjour configuration software. This software makes use of a discovery protocol of the multicast domain name system (mDNS) type (RFC6762), which communicates via user datagram protocol (UDP) multicast messages.

The first smart speaker 1a declares itself on the wireless network 8 using the following parameters, as specified in a customizable field (specifically the DNS-SD TXT field for the Bonjour protocol): role, audio group identifier, and first BSSID of the remote first radio point 9a to which the first smart speaker 1a is connected. The parameters may also include a level of priority, as described below.

The first BSSID is recovered by the application module in charge of managing the network from the Wi-Fi driver 7.

Thereafter, at regular intervals, the first smart speaker 1a uses the discovery protocol in order to search the wireless network 8 for any potential piece of audio equipment that forms part of the audio group of which it itself forms a part.

So long as another piece of audio equipment in the same group has not been found, the search continues and does not stop, and the first smart speaker 1a plays back the sound stream autonomously, without any stereo mode.

Figure 3:
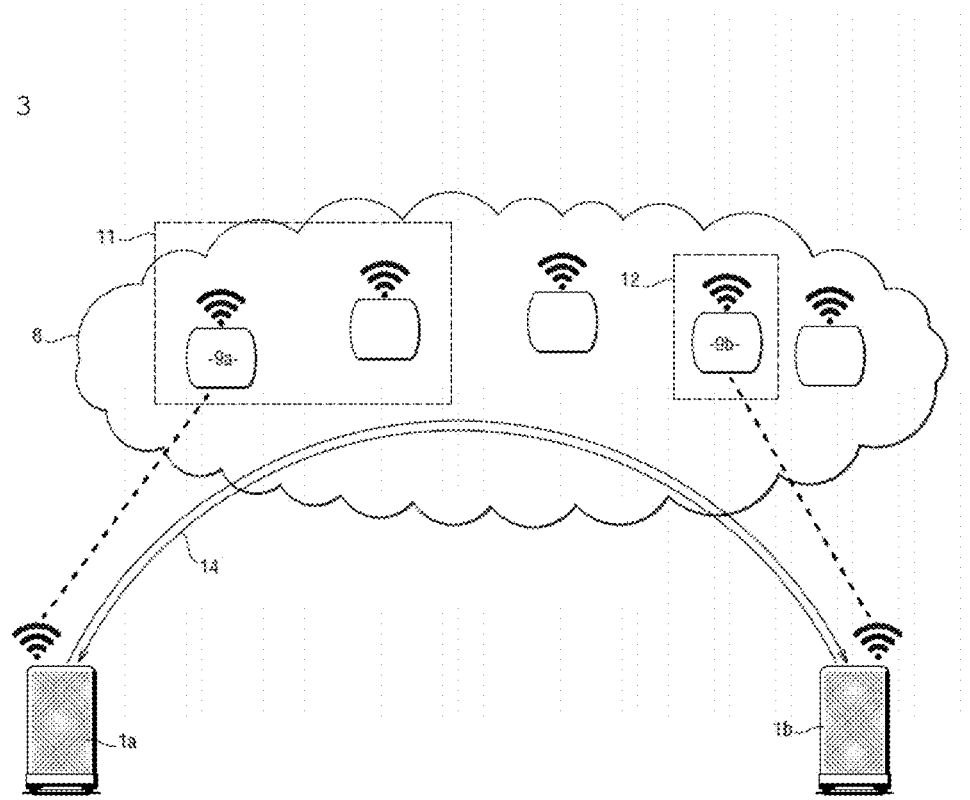
FIG. 3 is a figure similar to FIG. 2, in which a point-to-point connection is set up between the first smart speaker and the second smart speaker.

With reference to FIG. 3, when the processor module 4 of the first speaker 1a detects the second smart speaker 1b that is connected to the same wireless network 8 and that forms part of the same audio group, the first smart speaker 1a potentially establishes a point-to-point connection 14 with the second smart speaker 1b (although not necessarily, as explained below). By way of example, the point-to-point connection 14 is established using the WebSocket protocol. The second smart speaker 1b can then use the point-to-point connection 14 to send an event indicating that it has initiated a new network connection.

This event is generated on the second smart speaker 1b by the application module in charge of the network when the Wi-Fi driver 7 notifies it of a new connection.

The processor module 4 of the first smart speaker 1a then acquires the second BSSID of the second radio point 9b via which the second smart speaker 1b is connected to the wireless network 8.

The first smart speaker 1a obtains the second BSSID, e.g. by calling an application programming interface over the point-to-point connection 14 as mentioned above, or else in a field of a notification message, or indeed in a customized field of the discovery protocol that is being used, etc.

The processor module 4 of the first smart speaker 1a then compares the first BSSID with the second BSSID and determines whether the first and second BSSIDs are identical.

If the first and second BSSIDs are identical, the first smart speaker 1a and the second smart speaker 1b know that they share the same source for the time synchronization function (TSF), since they are connected to the same radio point. Stereo synchronization is effective.

The first smart speaker 1a and the second smart speaker 1b are then both continuously listening for potential new network connection events. Each connection event received by either one of the smart speakers 1 gives rise to a new verification of the BSSID. If the BSSID associated with the new connection turns out to be identical, then the stereo synchronization method continues. It should be observed that the new connection may correspond not only to a new piece of equipment, but also to one of the smart speakers 1a or 1b for which the connection happens to be modified, for any reason. By way of example, this might happen in a mesh Wi-Fi network in which the arbitration system has decided to move certain elements.

In contrast, if the first and second BSSIDs are different, then a selection stage is performed in order to select an optimum BSSID associated with an optimum radio point. The selection stage is described below.

The optimum radio point that is selected is either the first radio point 9a, or the second radio point 9b, or else another radio point.

By way of example, it is assumed that the optimum radio point is the second radio point 9b. The optimum BSSID is thus the second BSSID, which is different from the first BSSID.

Figure 4:
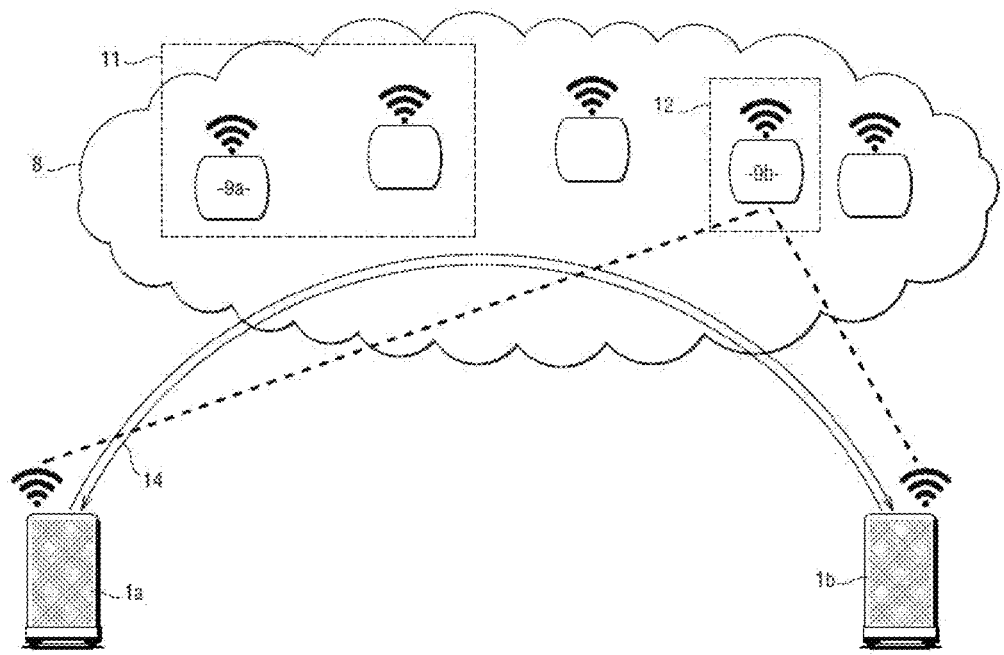
FIG. 4 is a figure similar to FIG. 3, in which the first smart speaker has roamed to reach the second radio point.

With reference to FIG. 4, the processor module 4 of the first smart speaker 1a then forces the first smart speaker 1a to connect to the optimum radio point, which is the second radio point 9b. In order to launch roaming towards the second radio point 9b, a new network block is created with priority that is higher than that of the block that was created when configuring the first smart speaker 1a. This network block has the particular feature of targeting a specific BSSID, namely the second BSSID of the second radio point 9b (which is the optimum BSSID).

The application module in charge of the network thus instructs the Wi-Fi driver 7 to launch roaming towards this specific BSSID in order to execute this new network block.

If the roaming is successful, the first smart speaker 1a and the second smart speaker 1b are both connected to the same radio point having the same BSSID. The first smart speaker 1a and the second smart speaker 1b then share the same time synchronization function source and synchronization of sound playback is ensured. Each smart speaker 1 acquires data coming from the time synchronization function and derives therefrom an internal clock that is synchronized at least on reception of each new Beacon frame.

The first smart speaker 1a uses said time synchronization function to play back a first sound stream forming part of a global sound stream being played back by the audio group. Likewise, the second smart speaker 1b uses said time synchronization function to play back a second sound stream forming part of a global sound stream being played back by the audio group.

If roaming fails, the application module in charge of the network uses the connection parameters that were specified in the network block during installation. A dedicated error could then be returned to the user with the first smart speaker 1a operating in autonomous manner, without stereo mode.

Once roaming has been successful, the first smart speaker 1a and the second smart speaker 1b are once again both continuously listening for potential new network connection events.

Each connection event received by either one of the smart speakers 1 gives rise to a new verification of the BSSID. If the BSSID of the additional piece of audio equipment is found to be different, then the synchronization method is performed again.

Figure 5:
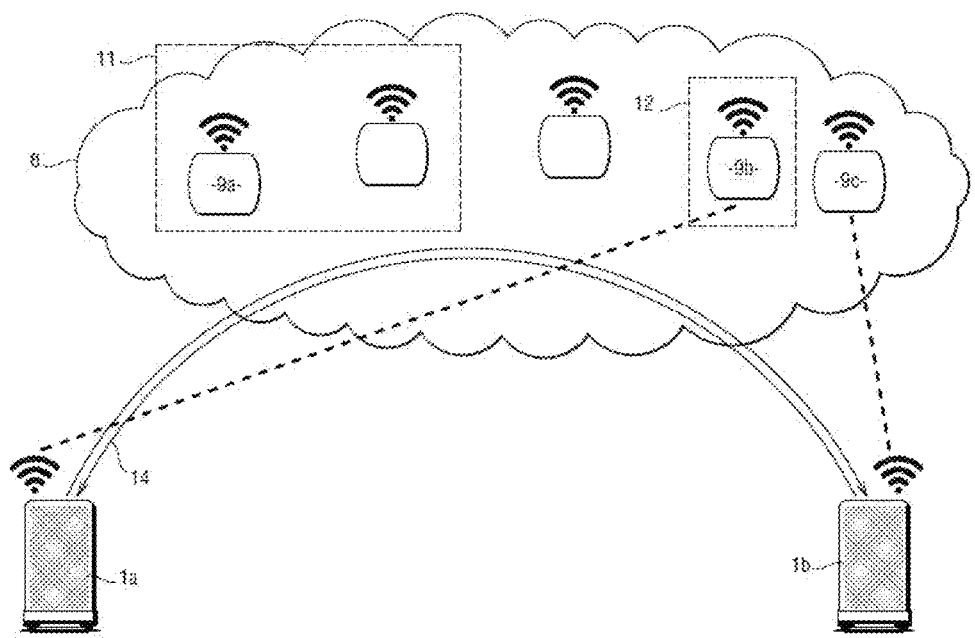
FIG. 5 is a figure similar to FIG. 4, in which the second smart speaker has roamed to reach a third radio point.

Thus, in FIG. 5, the second smart speaker 1b has detected a third piece of audio equipment (not shown) that is itself connected to a third radio point 9c that is identified by a third BSSID. The second smart speaker 1b has determined that the optimum BSSID is the third BSSID, and so it connects to the third radio point 9c.

Figure 6:
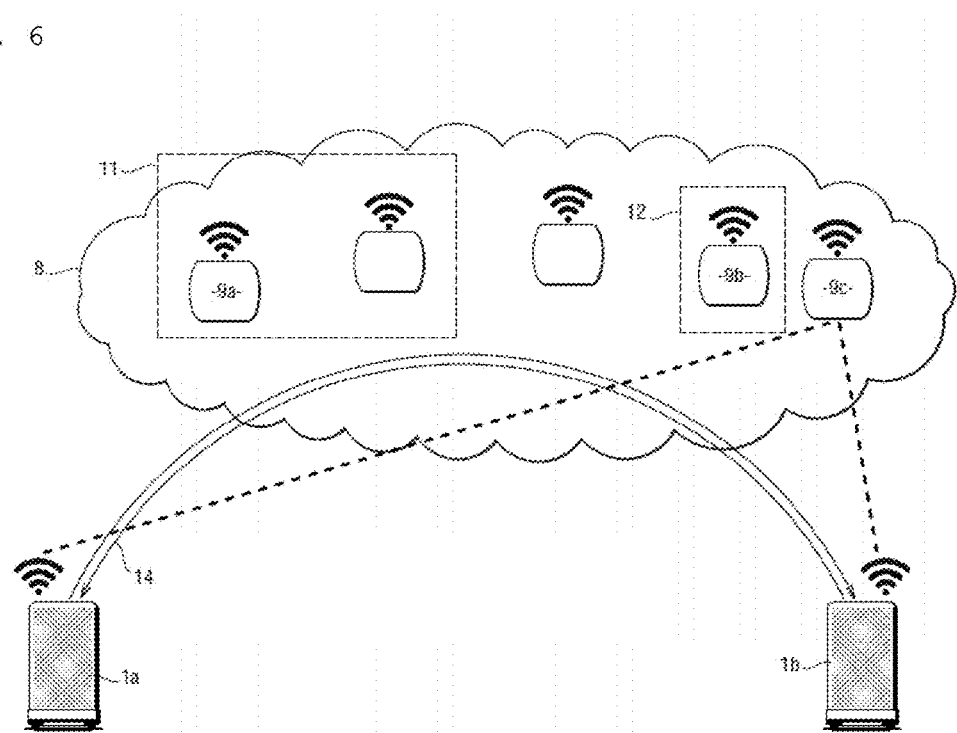
FIG. 6 is a figure similar to FIG. 5, in which the first smart speaker has roamed to reach the third radio point.

With reference to FIG. 6, the first smart speaker 1a detects, in turn, the third piece of audio equipment, determines, in turn, that the optimum BSSID is the third BSSID, and connects to the third radio point 9c.

It should be observed that since this invention relates to two pieces of audio equipment that are preferably located in the same room (in order to benefit from synchronized listening) or at least in the same home, it is possible in the great majority of situations for them both to attach to the same BSSID.

Attention is given below more particularly to the selection stage that enables the optimum BSSID to be selected.

Figure 7:
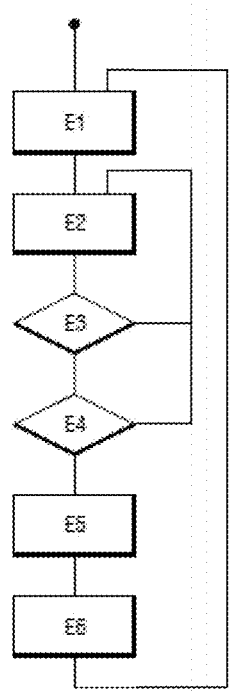
FIG. 7 shows steps of the synchronization method of the invention, in which a selection stage is performed in accordance with a first implementation.

With reference to FIG. 7, there follows a description of the synchronization method of the invention that includes a selection stage in a first implementation. The synchronization method is performed in the first smart speaker 1a.

The user has configured the smart speakers 1 and has connected them to the wireless network 8. The user has specified the audio group of which the smart speakers 1 form parts. The user has also specified the role of each smart speaker 1: the first smart speaker 1a plays back the left channel and the second smart speaker 1b plays back the right channel.

Furthermore, a distinct priority level is allocated to each of the first and second smart speakers 1a and 1b. The priority levels are representative of the roles performed in the audio group by the first and second smart speakers 1a and 1b. In this example, playback of the left channel is associated with a low priority level and playback of the right channel is associated with a high priority level.

Once connected to the wireless network 8, the first smart speaker 1a sends an mDNS message indicating that it is present, and also a Discovery message asking the other pieces of audio equipment to indicate they are present (step E1).

The first smart speaker 1a listens to the mDNS messages that it receives from the wireless network 8 in order to detect the arrival of other pieces of audio equipment in the audio group (step E2).

The first smart speaker 1a thus detects the second smart speaker 1b that also forms a part of the audio group.

For each mDNS message corresponding to a new piece of audio equipment of the audio group, the first smart speaker 1a acquires the BSSID of the new piece of audio equipment that is contained in the mDNS message and then compares it with its own BSSID. In this example, the processor module 4 of the first smart speaker 1a then acquires the second BSSID of the second radio point 9b via which the second smart speaker 1b is connected to the wireless network 8, and then compares it with the first BSSID. The processor module 4 of the first smart speaker 1a then determines whether the first and second BSSIDs are identical (step E3).

If both BSSIDs are identical, the first smart speaker 1a and the second smart speaker 1b are connected to the same radio point and they can be synchronized via the time synchronization function of said radio point; the synchronization method returns to step E2. Otherwise, the synchronization method moves on to step E4.

In this example, the first BSSID and the second BSSID are not identical, and the synchronization method moves on to step E4.

The first smart speaker 1a thus performs the selection stage in order to select an optimum radio point that is identified by an optimum BSSID. In this example, the optimum radio point that is selected is the radio point that is connected to that one of the first and second smart speakers 1a and 1b that has the higher priority.

If the priority level of the first smart speaker 1a is higher than that of the second smart speaker 1b, then the synchronization method returns to step E2: since its BSSID is the optimum BSSID, the first smart speaker 1a remains connected to its current radio point.

Otherwise, the synchronization method moves on to step E5.

In this example, since the priority level of the second smart speaker 1b is higher than that of the first smart speaker 1a, the synchronization method moves on to step E5.

In step E5, the processor module 4 of the first smart speaker 1a creates a temporary network block in the application module in charge of managing the network. The temporary network block has the same connection parameters as its current configuration, with the exception of the BSSID, which is forced to the value of the second BSSID as obtained in the mDNS message. This temporary Wi-Fi configuration block also receives a priority that is higher than that of the current configuration block.

The application module in charge of the network thus instructs the Wi-Fi driver 7 to launch roaming towards this specific BSSID in order to execute this new network block.

In step E6, the first smart speaker 1a thus applies the temporary configuration and reconnects to the wireless network 8 by using the second BSSID (the optimum BSSID). The synchronization method then returns to step E1.

Thereafter, the first smart speaker 1a and the second smart speaker 1b both share the same time synchronization function. The first smart speaker 1a uses said time synchronization function to play back a first sound stream forming part of a global sound stream being played back by the audio group. Likewise, the second smart speaker 1b uses said time synchronization function to play back a second sound stream forming part of a global sound stream being played back by the audio group.

It should be observed that the above-described selection stage does not require a point-to-point connection to be established between the first smart speaker 1a and the second smart speaker 1b.

Above, the priority levels are described as being representative of the roles performed in the audio group by the first and second smart speakers 1a and 1b.

Nevertheless, the priority levels could be defined differently, and for example on the basis of identifiers of the first and second smart speakers 1a and 1b.

For each smart speaker 1, the identifier that is taken into account may for example be the serial number or the media access control (MAC) address of the smart speaker 1. By way of example, the higher priority level may correspond to the identifier that is the greater.

Figure 8:
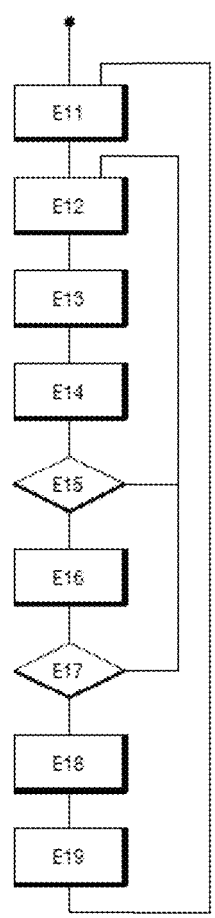
FIG. 8 shows steps of the synchronization method of the invention, in which a selection stage is performed in accordance with a second implementation.

With reference to FIG. 8, there follows a description of the synchronization method of the invention that includes a selection stage in a second implementation. The synchronization method is performed in the first smart speaker 1a.

Once connected to the wireless network 8, the first smart speaker 1a sends an mDNS message indicating that it is present, and also a Discovery message asking the other pieces of audio equipment to indicate that they are present (step E11).

The first smart speaker 1a listens to the mDNS messages that it receives from the wireless network 8 in order to detect the arrival of other pieces of audio equipment in the audio group (step E12).

For each mDNS message corresponding to a new piece of audio equipment in the audio group, the first smart speaker 1a establishes a point-to-point connection with the newly-connected piece of audio equipment, in this example a WebSocket connection (step E13).

In step E14, the first smart speaker 1a and the second smart speaker 1b make use of the point-to-point connection for exchanging connection information. The connection information comprises first connection information relating to a connection between the first smart speaker 1a and the first radio point 9a and/or the second radio point 9b, and second connection information relating to a connection between the second smart speaker 1b and the first radio point 9a and/or the second radio point 9b.

The first connection information is transmitted by the first smart speaker 1a to the second smart speaker 1b via the point-to-point connection 14. The second connection information is transmitted by the second smart speaker 1b to the first smart speaker 1a via the point-to-point connection 14.

This information contains the BSSID and it may contain other configuration data such as the frequency band (2.4 GHz or 5 GHz). This information may also contain one or more indicators of connection quality.

The first smart speaker 1a then acquires the second BSSID of the second radio point 9b via which the second smart speaker 1b is connected to the wireless network 8, and then compares it with the first BSSID (step E15). The first smart speaker 1a then determines whether the first and second BSSIDs are identical.

If both BSSIDs are identical, the synchronization method returns to step E12.

Otherwise, the first smart speaker 1a thus performs the selection stage in order to select an optimum radio point that is identified by an optimum BSSID, and the method moves on to step E16.

In step E16, the first smart speaker 1a compares the information concerning its network connection with the information concerning the network connection of the second smart speaker 1b in order to select the optimum BSSID.

For example, the first smart speaker 1a may select an optimum BSSID that corresponds to a particular frequency band. The first smart speaker 1a can thus give precedence to a BSSID corresponding to the 5 GHz frequency band in preference to a BSSID corresponding to the 2.4 GHz frequency band.

Optionally, the first smart speaker 1a can measure the quality with which it receives the second BSSID and exchange such quality information with the second smart speaker 1b via the point-to-point connection and then select the BSSID that provides better overall quality.

By way of example, it is assumed that the first smart speaker 1a presents connection quality equal to 90% with the first radio point 9a that is identified by the first BSSID (the BSSID to which the first smart speaker 1a is presently connected). The first smart speaker 1a measures reception quality with the second radio point 9b that is identified by the second BSSID, and by way of example this is equal to 80%. The first smart speaker 1a then sends this first connection information to the second smart speaker 1b.

Likewise, the second smart speaker 1b measures its own reception quality with each of the two radio points 9. For example, the second smart speaker 1b presents reception quality equal to 70% with the first radio point 9a that is identified by the first BSSID, and reception quality equal to 85% with the second radio point 9b that is identified by the second BSSID.

Consequently, with the first BSSID, the first smart speaker 1a presents connection quality equal to 90% and the second smart speaker 1b presents connection quality equal to 70%, which gives overall quality of 70%. With the second BSSID, the first smart speaker 1a presents connection quality equal to 80% and the second smart speaker 1b presents connection quality equal to 85%, which gives overall quality of 80%.

Under such circumstances, the processor module 4 of the first smart speaker 1a selects the second radio point 9b. It should be observed that the processor module 4 of the second smart speaker 1b would also necessarily select the second radio point 9b, since the first smart speaker 1a and the second smart speaker 1b both have the same information available.

The optimum BSSID that is selected is thus the second BSSID.

The processor module 4 of the first smart speaker 1a then compares its current BSSID, i.e. the first BSSID, with the optimum BSSID (step E17). If both BSSIDs are identical, the synchronization method returns to step E12. Otherwise, the synchronization method moves on to step E18.

In this example, the synchronization method moves on to step E18.

In step E18, the first smart speaker 1a launches roaming towards the second radio point 9b.

The processor module 4 of the first smart speaker 1a creates a temporary network block in the application module in charge of managing the network. The temporary network block has the same connection parameters as its current configuration, with the exception of the BSSID, which is forced to the value of the second BSSID as obtained in the mDNS message. This temporary Wi-Fi configuration block also receives a priority that is higher than that of the current configuration block.

The application module in charge of the network thus instructs the Wi-Fi driver 7 to launch roaming towards this specific BSSID in order to execute this new network block.

In step E19, the first smart speaker 1a thus applies the temporary configuration and reconnects to the wireless network by using the second BSSID (the optimum BSSID). The synchronization method then returns to step E11.

Optionally, in step E17, prior to moving on to step E11 or E18, the smart speakers 1 may exchange messages in order to confirm that they have indeed both selected the same optimum BSSID.

Figure 9:
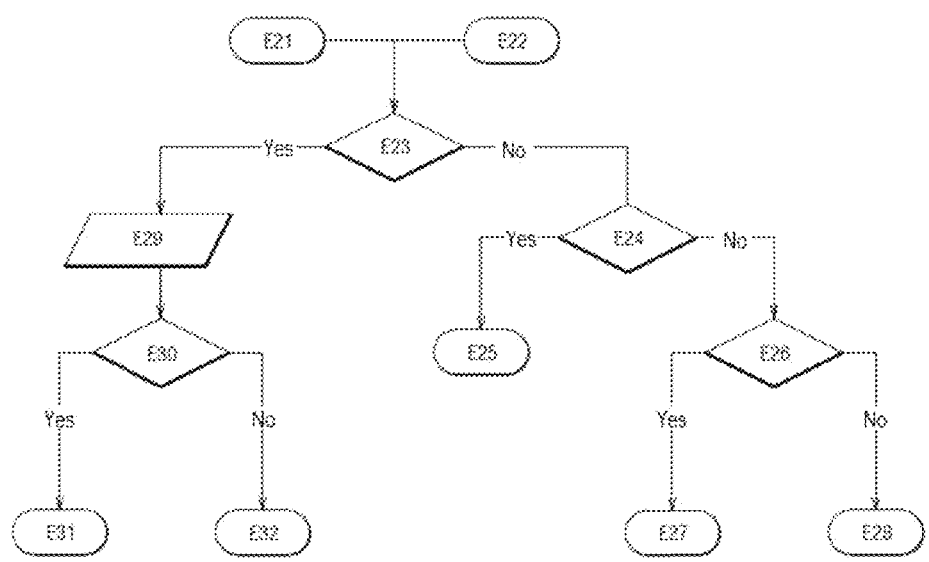
FIG. 9 shows steps of a selection stage in a third implementation.

With reference to FIG. 9, there follows a description of a selection phase in a third implementation.

Returning to the initial situation, the first smart speaker 1a is connected to the first radio point 9a that is identified by the first BSSID (step E21), and the second smart speaker 1b is connected to the second radio point 9b that is identified by the second BSSID (step E22).

The selection stage comprises the step of verifying whether the first radio point 9a and the second radio point 9b are indeed both visible simultaneously by the first smart speaker 1a and by the second smart speaker 1b (step E23).

If not, and if the first and second smart speakers 1a and 1b are both capable of establishing a radio connection only with the same one radio point selected from among the first and second radio points 9a and 9b, then the optimum radio point that is selected is said one radio point.

Thus, if the condition of step E23 is not satisfied, the selection stage comprises the step of verifying whether the first radio point 9a is indeed visible both for the first smart speaker 1a and for the second smart speaker 1b (step E24).

If so, the optimum radio point that is selected is the first radio point 9a (step E25).

If not, the selection stage comprises the step of verifying whether the second radio point 9b is indeed visible both for the first smart speaker 1a and by the second smart speaker 1b (step E26).

If so, the optimum radio point that is selected is the second radio point 9b (step E27). Otherwise, an error is detected (step E28).

Following the step E23, if the first radio point 9a and the second radio point 9b are indeed both visible simultaneously by the first smart speaker 1a and by the second smart speaker 1b, the selection stage moves on to step E29.

In this example, the first connection information produced by the first smart speaker 1a includes a level S1E1 for the radio signal transmitted by the first radio point 9a and received by the first smart speaker 1a, and a level S2E1 for the radio signal transmitted by the second radio point 9b and received by the first smart speaker 1a. Likewise, the second connection information produced by the second smart speaker 1b includes a level S1E2 for the radio signal transmitted by the first radio point 9a and received by the second smart speaker 1b, and a level S2E2 for the radio signal transmitted by the second radio point 9b and received by the second smart speaker 1b.

The selection stage then comprises the step E30 consisting in verifying whether $$\mathrm{MIN}(S1E1, S1E2) > \mathrm{MIN}(S2E1, S2E2)$$

where MIN is the "minimum" function.

If so, the optimum radio point is the first radio point 9a, and the optimum BSSID is the first BSSID (step E31).

Otherwise, the optimum radio point is the second radio point 9b, and the optimum BSSID is the second BSSID (step E32).

Naturally, the invention is not limited to the implementations described, but covers any variant coming within the ambit of the invention as defined by the claims.

The architecture described above for the smart speaker 1 is naturally not limiting. For example, the processor module in which the invention is performed could be integrated in full or in part with the LAN interface.

Above it is described that each smart speaker 1 uses the Bonjour protocol based on the mDNS in order to declare its presence on the network and in order to detect the other pieces of audio equipment in the audio group. It is possible to use other protocols. The smart speakers 1 could communicate by means of a wide area network (WAN) server, but it is preferable to use a multicast LAN protocol suitable for discovering local elements. By way of example, a possible alternative would be to use SSDP M-SEARCH messages, such as those used by universal plug and play (UPnP).

The point-to-point connection may take place through the LAN (possibly including a succession of network nodes), or else in some other way, e.g. via a Wi-Fi ad hoc network.

The synchronization method of invention can be implemented in or for connected audio equipment of any type, i.e. in or for any equipment capable of playing back a sound stream and capable of being connected to a network: a soundbar, a voice assistant, a TV set, a decoder box, etc.

Naturally, the audio group could have an arbitrary number of pieces of equipment.

Above, an implementation is described in which the synchronization method is performed in each piece of audio equipment: the description relates mainly to performing the synchronization method in the first smart speaker 1a, however the synchronization method could also be performed in the same manner in the second smart speaker 1b.

Thus, whatever the number of pieces of equipment making up the audio group, the synchronization method can perfectly well be performed in each individual piece of audio equipment: with the pieces of audio equipment then becoming synchronized in pairs.

Nevertheless, it is possible to envisage other configurations.

For example, provision could be made for two particular pieces of audio equipment to define an optimum BSSID, and for all the other pieces of audio equipment in the group to connect to said optimum BSSID.

It is also possible to envisage that a single piece of audio equipment performs the synchronization method for the entire group, which piece of equipment then retrieves all of the useful information, defines the optimum BSSID, and instructs the other pieces of audio equipment to connect said optimum. BSSID.

Likewise, the synchronization method could perfectly well be performed in a piece of equipment that is not audio equipment, e.g. by the residential gateway or indeed by a remote server to which the gateway is connected.

The invention claimed is:

1. A synchronization method performed for a first piece of audio equipment connected via a first radio point that is identified by a first BSSID to a wireless network that is identified by an SSID, the first piece of audio equipment forming part of an audio group, the synchronization method comprising the following steps:
    detecting a second piece of audio equipment connected to the same wireless network and forming part of the same audio group;
    acquiring a second BSSID of a second radio point via which the second piece of audio equipment is connected to the wireless network, and then determining whether the first BSSID and the second BSSID are identical;
    if not, performing a selection stage to select an optimum radio point that is identified by an optimum BS SID;
    if the optimum BSSID is different from the first BSSID, connecting the first piece of audio equipment to the wireless network via the optimum radio point;
    using a time synchronization function supplied by the optimum radio point to synchronize playback performed by the first piece of audio equipment of a first sound stream forming part of a global sound stream played back by the audio group.

2. The synchronization method according to claim 1, wherein a distinct priority level is allocated to each of the first and second pieces of audio equipment, and wherein, during the selection stage, the optimum radio point that is selected is the radio point that is connected to that one of the first and second pieces of audio equipment that has the higher priority level.

3. The synchronization method according to claim 2, wherein the priority levels are representative of the respective roles performed in the audio group by the first and second pieces of audio equipment.

4. The synchronization method according to claim 3, wherein a plurality of audio channels are defined in the audio group, and wherein each role corresponds to playing back a respective one of the audio channels.

5. The synchronization method according to claim 2, wherein the priority levels are defined from identifiers of the first and second pieces of audio equipment.

6. The synchronization method according to claim 5, wherein the identifiers are serial numbers or MAC addresses.

7. The synchronization method according to claim 1, including the step of exchanging both first connection information relating to a connection between the first piece of audio equipment and the first radio point and/or the second radio point, and also second connection information relating to a connection between the second piece of audio equipment and the first radio point and/or the second radio point, the selection stage comprising the step of selecting the optimum radio point from the first connection information and from the second connection information.

8. The synchronization method according to claim 7, wherein, after detecting the second piece of audio equipment, the first piece of audio equipment establishes a point-to-point connection with the second piece of audio equipment, said point-to-point connection enabling the first and second pieces of audio equipment to exchange the first connection information and the second connection information.

9. The synchronization method according to claim 8, wherein the point-to-point connection uses a Web Socket protocol.

10. The synchronization method according to claim 7, wherein, if the first and second pieces of audio equipment are both capable of establishing a radio connection only with the same one radio point selected from among the first and second radio points, then the optimum radio point that is selected is said one radio point.

11. The synchronization method according to claim 7, wherein the first connection information includes a level S1E1 for the radio signal transmitted by the first radio point and received by the first piece of audio equipment, and a level S2E1 for the radio signal transmitted by the second radio point and received by the first piece of audio equipment, wherein the second connection information includes a level S1E2 for the radio signal transmitted by the first radio point and received by the second piece of audio equipment, and a level S2E2 for the radio signal transmitted by the second radio point and received by the second piece of audio equipment, and wherein, if:

$$MIN(S1E1, S1E2) > MIN(S2E1, S2E2)$$

then the optimum radio point that is selected is the first radio point.

12. The synchronization method according to claim 1, wherein detecting the second piece of audio equipment comprises acting at regular intervals to perform the step of searching the wireless network by using a discovery protocol.

13. The synchronization method according to claim 1, the synchronization method being performed in the first piece of audio equipment.

14. Audio equipment including a LAN interface and a processor module in which the synchronization method according to claim 1 is performed.

15. A non-transitory computer-readable storage medium storing a computer program including instructions for causing the processor module of the audio equipment according to claim 14 to execute steps of a synchronization method performed for a first piece of audio equipment connected via a first radio point that is identified by a first BSSID to a wireless network that is identified by an SSID, the first piece of audio equipment forming part of an audio group, the synchronization method comprising the following steps:
  detecting a second piece of audio equipment connected to the same wireless network and forming part of the same audio group;
  acquiring a second BSSID of a second radio point via which the second piece of audio equipment is connected to the wireless network, and then determining whether the first BSSID and the second BSSID are identical;
  if not, performing a selection stage to select an optimum radio point that is identified by an optimum BSSID;
  if the optimum BSSID is different from the first BSSID, connecting the first piece of audio equipment to the wireless network via the optimum radio point;
  using a time synchronization function supplied by the optimum radio point to synchronize playback performed by the first piece of audio equipment of a first sound stream forming part of a global sound stream played back by the audio group.

* * * * *